(12) United States Patent
Liu

(10) Patent No.: US 11,662,505 B2
(45) Date of Patent: May 30, 2023

(54) FILM STRUCTURE AND PREPARATION METHOD THEREOF

(71) Applicant: Shenzhen China Star Optoelectronics Semiconductor Display Technology Co., Ltd., Guangdong (CN)

(72) Inventor: Guohe Liu, Guangdong (CN)

(73) Assignee: Shenzhen China Star Optoelectronics Semiconductor Display Technology Co., Ltd., Guangdong (CN)

( * ) Notice: Subject to any disclaimer, the term of this patent is extended or adjusted under 35 U.S.C. 154(b) by 721 days.

(21) Appl. No.: 16/608,753

(22) PCT Filed: Jul. 10, 2019

(86) PCT No.: PCT/CN2019/095498
§ 371 (c)(1),
(2) Date: Oct. 25, 2019

(87) PCT Pub. No.: WO2020/228120
PCT Pub. Date: Nov. 19, 2020

(65) Prior Publication Data
US 2021/0333616 A1    Oct. 28, 2021

(30) Foreign Application Priority Data
May 14, 2019    (CN) .......................... 201910397965.1

(51) Int. Cl.
*G02B 1/12*    (2006.01)
*G02B 1/11*    (2015.01)
*G02F 1/1335*    (2006.01)

(52) U.S. Cl.
CPC ................. *G02B 1/12* (2013.01); *G02B 1/11* (2013.01); *G02F 1/133502* (2013.01)

(58) Field of Classification Search
CPC . G02F 2201/38; G02F 1/133502; G02B 1/11; G02B 1/12; G02B 2207/107
See application file for complete search history.

(56) References Cited

U.S. PATENT DOCUMENTS

| | | |
|---|---|---|
| 5,754,260 A | 5/1998 | Ooi et al. |
| 2004/0195962 A1 | 10/2004 | Nakamura et al. |
| 2006/0164740 A1 | 7/2006 | Sone et al. |
| 2007/0261601 A1 | 11/2007 | Ikeda et al. |
| 2008/0297029 A1 | 12/2008 | Cok |
| 2010/0196687 A1 | 8/2010 | Isono et al. |

(Continued)

FOREIGN PATENT DOCUMENTS

| | | |
|---|---|---|
| CN | 1364236 A | 8/2002 |
| CN | 1842727 A | 10/2006 |

(Continued)

*Primary Examiner* — Jia X Pan
(74) *Attorney, Agent, or Firm* — PV IP PC; Wei Te Chung; Zhigang Ma

(57) ABSTRACT

A film structure and a preparation method thereof are provided. The film structure is provided with pore structures; the pore structure includes a gas space and a first protective layer, the first protective layer covers the gas space, and the gas space is filled with a gas. The pore structures with the gas are provided in the film structure, a refractive index of the pore structures is close to a refractive index of air, and a refractive index of the entire film structure is reduced by the influence of the pore structures.

5 Claims, 3 Drawing Sheets

(56) References Cited

U.S. PATENT DOCUMENTS

| | | | |
|---|---|---|---|
| 2012/0081909 A1 | 4/2012 | Nishida | |
| 2013/0088782 A1 | 4/2013 | Walker, Jr. et al. | |
| 2014/0272387 A1* | 9/2014 | Jewhurst | C09D 7/63 428/323 |
| 2015/0225569 A1* | 8/2015 | Kameno | C01F 5/28 106/409 |
| 2016/0052199 A1* | 2/2016 | Hansen | B29C 67/202 216/55 |
| 2018/0069234 A1 | 3/2018 | Friend et al. | |
| 2018/0151841 A1 | 5/2018 | Okumoto et al. | |
| 2020/0409210 A1* | 12/2020 | Li | G02F 1/133512 |

FOREIGN PATENT DOCUMENTS

| | | | | |
|---|---|---|---|---|
| CN | 101052685 A | | 10/2007 | |
| CN | 101470216 A | | 7/2009 | |
| CN | 101711439 A | | 5/2010 | |
| CN | 101765791 A | | 6/2010 | |
| CN | 101809465 A | | 8/2010 | |
| CN | 1503606 B | | 9/2010 | |
| CN | 102250377 A | | 11/2011 | |
| CN | 103339535 A | | 10/2013 | |
| CN | 104779265 A | | 7/2015 | |
| CN | 205692907 U | * | 11/2016 | H01M 4/134 |
| CN | 205692907 U | | 11/2016 | |
| CN | 109709710 A | | 5/2019 | |
| WO | 2006009296 A1 | | 1/2006 | |
| WO | 2008069162 A1 | | 6/2008 | |

\* cited by examiner

… (1)

FILM STRUCTURE AND PREPARATION METHOD THEREOF

FIELD OF INVENTION

The present application relates to a film structure technique, and in particular to a film structure and a preparation method thereof.

BACKGROUND OF INVENTION

Liquid crystal display (LCD) panel technologies are gradually maturing, and demands for high resolution panels are increasing. As resolutions of the liquid crystal panels increase, aperture ratios of the liquid crystal panels decrease, but at the same time, a reflectance of the liquid crystal panels to external light also gradually increases.

In general, a reflective interface of a liquid crystal panel is a connection interface between two different refractive index film layers, so reducing the reflectance of the liquid crystal panel can be achieved by adjusting refractive indexes of the film layers.

Therefore, the present application provides a film structure and a preparation method thereof to solve the above technical problems.

SUMMARY OF INVENTION

The embodiments of the present application provide a film structure and a preparation method thereof to solve the technical problem that the existing film structures have high refractive indexes.

An embodiment of the present application provides a film structure, including a plurality of pore structures disposed in the film structure;

wherein the pore structure includes a gas space and a first protective layer, the first protective layer covers the gas space, and the gas space filled with a gas;

the film structure includes a first region and a second region, the first region and the second region are connected to each other, and a plurality of particle structures are disposed in the film structure;

the particle structures are disposed in the first region, and the pore structures are disposed in the second region;

the particle structure includes a mixture and a second protective layer, and the second protective layer covers the mixture;

the mixture includes a polypropylene carbonate resin; and material of the first protective layer is SiNx or SiOx or an organic photoresist material, and material of the second protective layer is SiNx or SiOx or an organic photoresist material.

In the film structure of the present application, the gas includes a gas that is formed by thermally decomposition of the polypropylene carbonate resin.

An embodiment of the present application further provides a film structure, including a plurality of pore structures disposed in the film structure;

wherein the pore structure includes a gas space and a first protective layer, the first protective layer covers the gas space, and the gas space filled with a gas.

In the film structure of the present application, the film structure includes a first region and a second region, the first region and the second region are connected to each other, and a plurality of particle structures are disposed in the film structure; and the particle structures are disposed in the first region, and the pore structures are disposed in the second region.

In the film structure of the present application, the particle structure includes a mixture and a second protective layer, and the second protective layer covers the mixture.

In the film structure of the present application, the mixture includes a polypropylene carbonate resin.

In the film structure of the present application, material of the first protective layer is SiNx or SiOx or an organic photoresist material, and material of the second protective layer is SiNx or SiOx or an organic photoresist material.

In the film structure of the present application, the gas includes a gas that is formed by thermally decomposition of a polypropylene carbonate resin.

The present application further relates a film structure preparing method, including steps of:

preparing a plurality of particle structures;

mixing the particle structures into a film material to form a mixed material;

coating the mixed material on a substrate to form a mixed film layer;

performing an ultraviolet light irradiation treatment to the mixed film layer; and performing a heat treatment to the mixed film layer, wherein at least a part of the particle structures is thermally decomposed into a gas, so the decomposed particle structures are converted into a plurality of pore structures.

In the film structure preparing method, the step of preparing the particle structures includes steps of:

preparing a plurality of mixtures;

forming a protective layer on an outer surface of the mixture to cover the mixture, wherein the mixture and the protective layer form the particle structure.

In the film structure preparing method, the mixture includes a polypropylene carbonate resin and a photoacid generator.

In the film structure preparing method, the step of performing the heat treatment to the mixed film layer, wherein the at least a part of the particle structures is thermally decomposed into the gas, so the decomposed particle structures are converted into the pore structures, includes:

heating the mixed film layer at a first setting temperature, wherein all of the polypropylene carbonate resin of the particle structures is thermally decomposed into the gas to convert all of the particle structures into the pore structures.

In the film structure preparing method, the first setting temperature is M, and $150°\,C. \leq M \leq 250°\,C.$ In the film structure preparing method, the mixed film layer includes a first region and a second region, the first region and the second region are connected each other;

the step of performing the ultraviolet light irradiation treatment to the mixed film layer includes following steps of:

shielding the first region with a mask; and illuminating the ultraviolet light to the second region.

In the film structure preparing method, the step of performing the heat treatment to the mixed film layer, wherein the at least a part of the particle structures is thermally decomposed into the gas, so the decomposed particle structures are converted into the pore structures, includes:

heating the mixed film layer at a second setting temperature, and the polypropylene carbonate resin of the particle structures located in the second region is thermally decomposed into the gas, so the particle structures in the second region are converted into the pore structures.

In the film structure preparing method, a second setting temperature is N, and $100°\,C. \leq N < 150°\,C.$ Compared with the film structure in the prior art, the film structure of the present application and the preparation method thereof have a pore structures with a gas disposed in the film structure, so that the refractive index of the pore structures is close to the refractive index of air, and a refractive index of the entire film structure is reduced by the influence of the pore structures; the technical problem that the existing film structure has high refractive index is solved.

DRAWINGS

In order to more clearly illustrate embodiments of the present application or the technical solutions in the prior art, the drawings used in the embodiments will be briefly described below. The drawings in the following description are only partial embodiments of the present application, and those skilled in the art can obtain other drawings according to the drawings without any creative work.

DETAILED DESCRIPTION OF EMBODIMENTS

Figure 1:
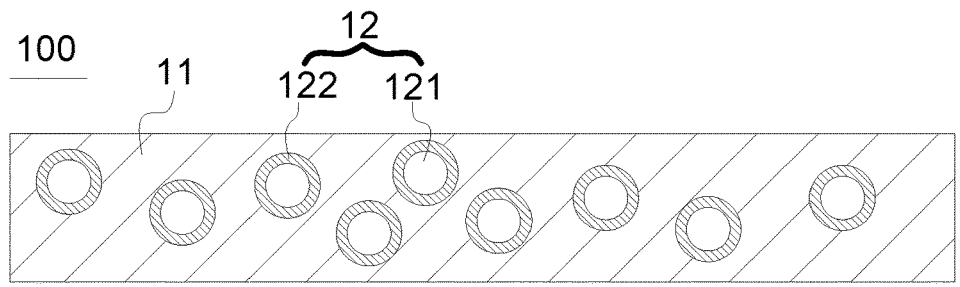
FIG. 1 is a schematic structural view of a film structure according to a first embodiment of the present application.

Please refer to the drawings in the attached drawings, in which the same reference numerals represent the same components. The following description is based on the specific embodiments of the present invention as illustrated, and should not be construed as limiting the specific embodiments that are not described herein.

Please refer to FIG. 1. FIG. 1 is a schematic structural view of a film structure according to a first embodiment of the present application. A plurality of pore structures 12 are disposed in a film structure 100 of the first embodiment of the present application.

The pore structure 12 includes a gas space 121 and a first protective layer 122. The first protective layer 122 covers the gas space 121. The gas space 121 is filled with a gas.

The first embodiment forms the plurality of gas-filled pore structures 12 in the film structure 100. Because a refractive index of the pore structures 12 is close to a refractive index of air, a refractive index of the entire film structure 100 is reduced by the influence of the pore structures 12, that is, an amount of the pore structures 12 is greater, the refractive index of the film structure 100 is lower. Therefore, the refractive index of the film structure 100 can be adjusted by the amount of the pore structure 12 added.

The film structure 100 further includes a main film layer 11 covering the pore structures 12. Material of the main film layer 11 may be a black matrix photoresist material or a transparent organic photoresist, such as material of an organic insulating film. Certainly, the material of the main film layer 11 may also be an inorganic material, such as a glass film layer or the like.

In the first embodiment, optionally, the gas in the gas space 121 includes a gas that is formed by thermally decomposition of the polypropylene carbonate resin, and is not limited thereto. The gas in the gas space 121 can also be decomposed from other substances, such as other esters and alcohols. Whenever the substance is decomposed, the main film layer 11 is not damaged.

In a process of forming the pore structure 12, the pore structure 12 is formed by thermally decomposition of a plurality of particle structures. The particle structure includes a polypropylene carbonate resin and a first protective layer covering the polypropylene carbonate resin. When the particle structures are thermally decomposed into the gas, the gas is formed in the gas space 121 covered by the first protective layer 122. Therefore, the first protective layer 122 functions to support an entire pore structure 12.

In addition, optionally, material of the first protective layer 122 is SiNx or SiOx or an organic photoresist material. Specifically, when the material of the first protective layer 122 is an inorganic material such as SiNx or SiOx, the first protective layer 122 has a strong sealing property, and the gas in the gas space 121 will not leak out. When the material of the first protective layer 122 is an organic material, the first protective layer 122 can adhere well to the main film layer 11.

It should be noted that the present application can be applied to display panels and touch panels, and can also be applied to windows, showcases, etc., that is, a scenario or an article that reduces external light reflection.

For the preparation process of the first embodiment, please refer to the specific content of the following text of a film structure preparing method according to an embodiment of the present application, and details are not described herein.

Figure 2:
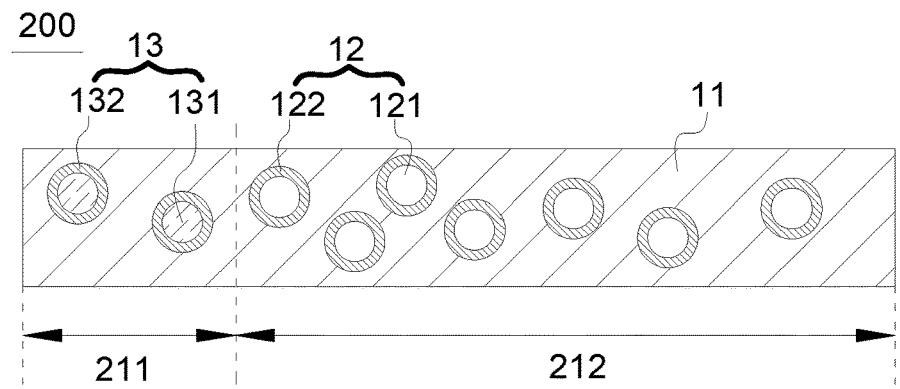
FIG. 2 is a schematic structural view of a film structure according to a second embodiment of the present application.

Please refer to FIG. 2. FIG. 2 is a schematic structural view of a film structure according to a second embodiment of the present application. The film structure 200 according to the second embodiment of the present application includes a main film layer 11 and a plurality of pore structures 12.

The second embodiment is different from the first embodiment in that: the film structure 200 includes a first region 211 and a second region 212. The first region 211 and the second region 212 are connected to each other. The film structure 200 further has a plurality of particle structures 13 disposed therein.

The particle structures 13 are disposed in the first region 211. The pore structures 12 are disposed in the second region 212.

The second embodiment of the present invention provided with the particle structures 13 in the first region 211 is because the refractive index required by the film structure 200 in the first region 211 is large. The second region 212 provided with the pore structures is because the refractive index required by the film structure 200 in the second region 212 is small. Therefore, the second embodiment can configure the arrangements of the particle structures 13 and the pore structures 12 by configuring different refractive index required regions.

The particle structure 13 includes a mixture 131 and a second protective layer 132. The second protective layer 132 covers the mixture 131. Specifically, the mixture 131 is composed of a mixture of a polypropylene carbonate resin and a photoacid generator.

Material of the second protective layer 132 is SiNx or SiOx or an organic photoresist material. The material of the first protective layer 122 and the material of the second protective layer 132 may be the same or different.

In the second embodiment, specific regions of the film structure 200 may be specifically treated according to needs of different refractive indexes, such that the different regions correspond to the different refractive indexes.

For the preparation process of the second embodiment, please refer to the specific content of the following text of a film structure preparing method according to an embodiment of the present application, and details are not described herein.

Figure 3:
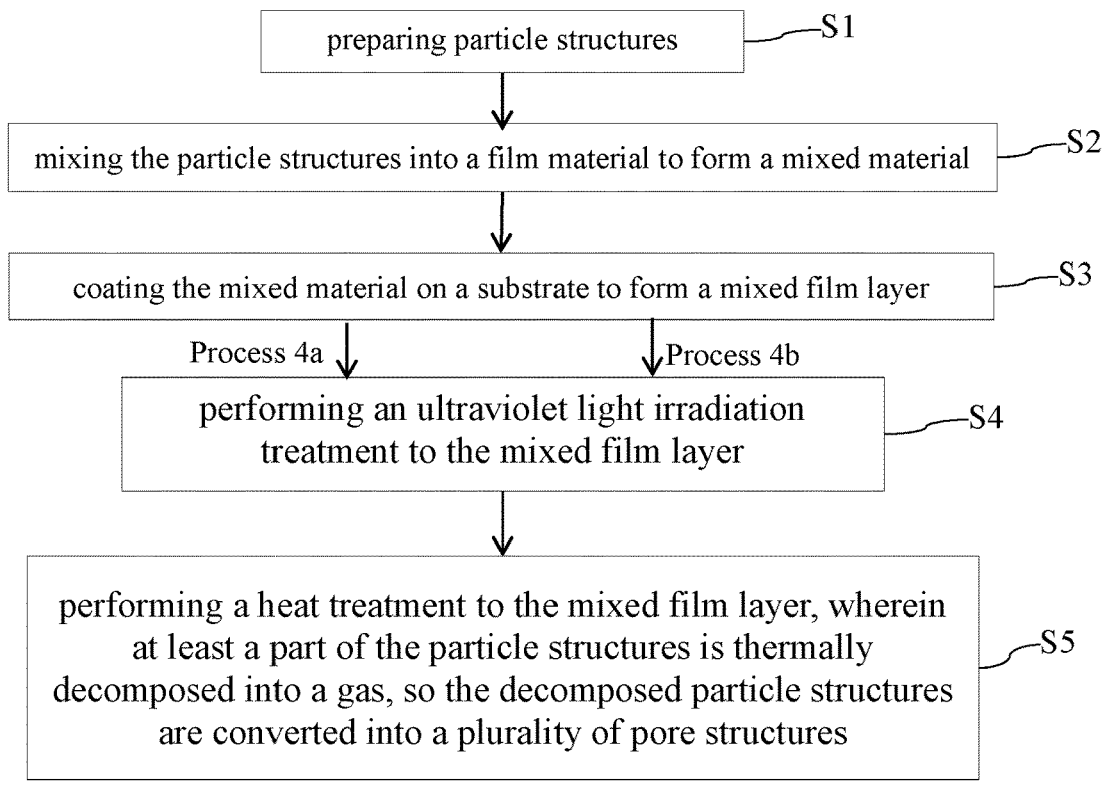
FIG. 3 is a schematic flowchart of a film structure preparing method according to an embodiment of the present application.
Figure 4:
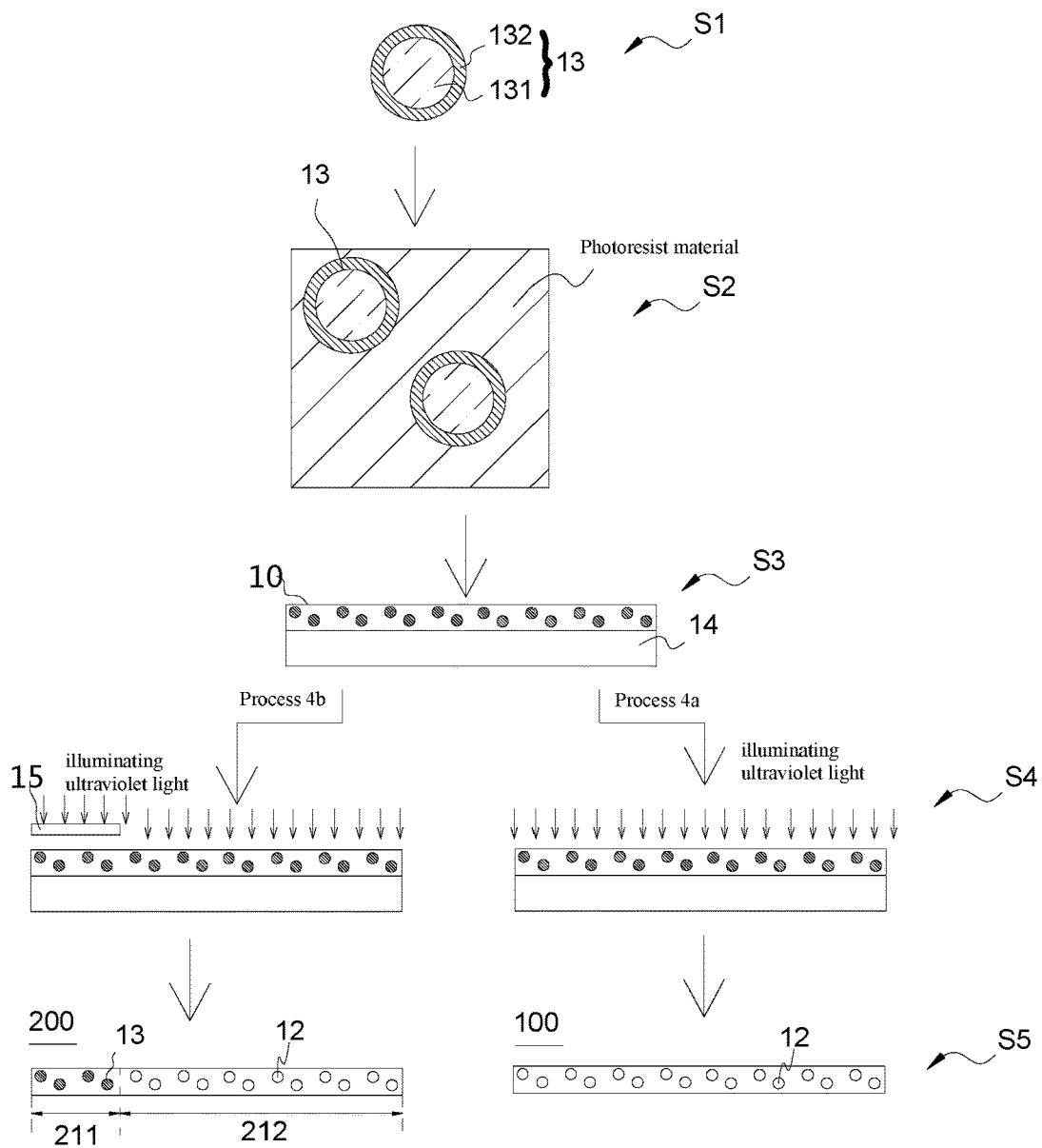
FIG. 4 is another schematic flowchart of a film structure preparing method according to an embodiment of the present application.

Please refer to FIG. 3 and FIG. 4, FIG. 3 is a schematic flowchart of a film structure preparing method according to an embodiment of the present application; and FIG. 4 is another schematic flowchart of a film structure preparing method according to an embodiment of the present application. The film structure preparing method of the embodiment of the present application includes following steps of:

S1: preparing a plurality of particle structures;
S2: mixing the particle structures into a film material to form a mixed material;
S3: coating the mixed material on a substrate to form a mixed film layer;
S4: performing an ultraviolet light irradiation treatment to the mixed film layer; and
S5: performing a heat treatment to the mixed film layer, wherein at least a part of the particle structures is thermally decomposed into a gas, so the decomposed particle structures are converted into a plurality of pore structures.

The film structure preparing method of the present embodiment reduces a refractive index of the film structure by mixing the particle structures and thermally decomposing the particle structures to form the pore structures, thereby forming the pore structures in the film structure. Specifically, the following context is specific steps of the film structure preparing method according to the present embodiment.

Figure 5:
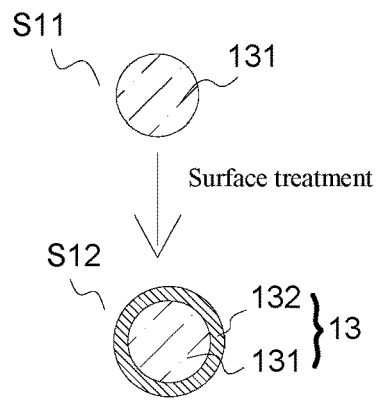
FIG. 5 is a schematic flowchart of step S1 of the film structure preparing method according to the embodiment of the present application.

The step S1: preparing the plurality of particle structures 13. Please refer to FIG. 5, the step S1 includes the following steps of:

S11: preparing a plurality of mixtures 131;
S12: forming a protective layer on an outer surface of the mixture 131 to cover the mixture 131. The mixture 131 and the protective layer form the particle structure 13.

In step S11, the mixture 131 is composed of a mixture of substances such as polypropylene carbonate (PPC) and a photoacid generator (PAG). Certainly, the mixture 131 may also include other esters and alcohols. Specifically, the mixture 131 is a spherical shape and has a particle diameter of between 1 and 3 microns. When the mixture 131 is not irradiated with an ultraviolet light, the thermal decomposition temperature of the mixed resin system is between 150 and 250 degrees Celsius. However, after an ultraviolet light irradiation treatment, the mixed resin system can be decomposed at 50 degrees Celsius.

In step S12, material of the protective layer covered around an outer surface of the mixture 131 is SiNx or SiOx or an organic photoresist material. Specifically, when the material of the protective layer is an inorganic material such as SiNx or SiOx, the protective layer has a strong sealing property; when the material of the protective layer is an organic material, the protective layer can adhere well to the main film layer.

When the particle structures 13 are ready, the process proceeds to the step S2.

The step S2: mixing the particle structures 13 into the film material to form the mixed material. Specifically, the particle structures 13 are uniformly mixed into the film material by physical stirring. The film material of the film layer may be a black matrix photoresist material or a transparent organic photoresist such as material of an organic insulating film. Certainly, the film material may also be an inorganic material. In addition, a ratio of the particle structure 13 mixed into the film material can be configured according to a need of the actual refractive index. Then, the process proceeds to the step S3.

The step S3: coating the mixed material on the substrate 14 to form a mixed film layer. Specifically, the mixed material may be formed on the substrate 14 by coating to form the mixed film layer 10, and then formed into a patterned or non-patterned mixed film layer by a photolithography process. Then, the process proceeds to the step S4.

Step S4: performing the ultraviolet light irradiation treatment to the mixed film layer 10.

Specifically, when the mixed film layer 10 needs to uniformly reduce an overall refractive index, the step 4 is subjected to process step 4a that performs an ultraviolet light irradiation treatment to the entire of the mixed film layer, to reduce the decomposition temperature of the mixtures 131 of all the particle structures 13. The process step 4a corresponds to the film structure of the above first embodiment.

When the mixed film layer 10 needs to lower a local refractive index, the step 4 is subjected to process step 4b that performs an ultraviolet light irradiation treatment to a local region of the mixed film layer. The process step 4b corresponds to the film structure of the above second embodiment.

Figure 6:
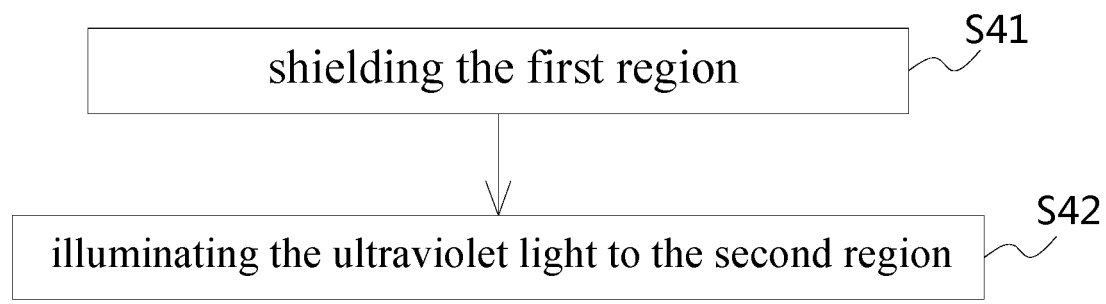
FIG. 6 is a schematic flowchart of process 4b of step S4 of the film structure preparing method according to the embodiment of the present application.

Referring to FIG. 4 and FIG. 6, in the process step 4b, the mixed film layer 10 includes a first region and a second region, the first region and the second region are connected to each other; and the step S4 includes the following steps of:

S41: shielding the first region with a mask;
S42: illuminating the ultraviolet light to the second region.

In the step S41, the mask 15 may be used to shield the first region, such that the particle structures of the first region are not irradiated with the ultraviolet light, so that the thermal decomposition temperature of the particle structure of this region is not lowered.

In step S42, because the second region is irradiated with the ultraviolet light, the thermal decomposition temperature of the particle structures of this region is lowered.

In the process steps 4a and 4b, when ultraviolet light is irradiated, the predominant wavelength of the ultraviolet light is 254 nm, and an accumulated amount of light is greater than or equal to 800 mj. Then, the process proceeds to the step S5.

The step S5: performing the heat treatment to the mixed film layer 10, wherein at least a part of the particle structures 13 is thermally decomposed into a gas, so the decomposed particle structures 13 are converted into a plurality of pore structures 12.

Specifically, when the step S5 is followed by the process step 4a, the step S5 is specifically: heating the mixed film layer 10 at a first setting temperature M. All of the polypropylene carbonate resin of the particle structures 13 is thermally decomposed into the gas, to convert all of the particle structures 13 into the pore structures 12, and the mixed film layer 10 becomes the film structure 100.

The refractive index of the pore structures 12 is close to the refractive index of air of 1.0, so the total refractive index of the entire film layer is reduced by the influence of the pore structures 12.

Please refer to FIG. 1, the particle structures 13 is heated, and the mixture 131 in the inner is thermally decomposed into the gas, so that the gas forms the gas space 121 under the coverage of the protective layer, and the protective layer at this time is the first protective layer 122, and the material of the first protective layer 122 does not convert.

In the process of heating the mixed film layer 10, the heating temperature (first setting temperature M) may be set to 150° C. M 250° C. Specifically, the mixtures 131 start to decompose at 50 degrees Celsius after being subjected to the ultraviolet light, and most of the decomposition occurs at approximately 100 degrees Celsius, and at 150 degrees Celsius, the mixtures 131 are completely decomposed. It is because the mixtures 131 are decomposed, so that the mixtures 131 become the gas, and the particle structures 13 are converted into the pore structures 12. In addition, when the first setting temperature M is greater than 250 degrees Celsius, the mixed film layer 10 will be damaged, so the first setting temperature M needs to be no more than 250 degrees Celsius.

When the step S5 is followed by the process step 4b, the step S5 is specifically: heating the mixed film layer 10 at a second setting temperature N, and the polypropylene carbonate resin of the particle structures located in the second region is thermally decomposed into the gas, so the particle structures 13 in the second region are converted into the pore structures 12.

When the pore structures 12 are formed, the mixed film layer 10 is converted into a film structure 200, in which the first region of the mixed film layer 10 corresponds to the first region 211 of the film structure 200, and the second region of the mixed film layer 10 corresponds to the second region 212 of the film structure 200.

Specifically, because the particle structures at the first region are not irradiated with the ultraviolet light, so the thermal decomposition temperature of the particle structures in this region is greater than 150 degrees Celsius, and the particle structures at the second region are irradiated with the ultraviolet light, so the thermal decomposition temperature of this region is 50 degrees Celsius. Therefore, in order to obtain the film structure 200 having different refractive indexes, a range of the second setting temperature N is set to be 100° C.≤N<150° C.

The preparation process of this embodiment is completed.

Compared with the film structure in the prior art, the film structure of the present application and the preparation method thereof have a pore structures with a gas disposed in the film structure, so that the refractive index of the pore structures is close to the refractive index of air, and a refractive index of the entire film structure is reduced by the influence of the pore structures; the technical problem that the existing film structure has high refractive index is solved.

As mentioned in the above, various other changes and modifications can be made by those skilled in the art in accordance with the technical solutions and technical concept of the present application, and all such changes and modifications are subject to the protection scope of the appended claims.

The invention claimed is:

1. A film structure preparing method, comprising steps of:
preparing a plurality of particle structures;
mixing the particle structures into a film material to form a mixed material;
coating the mixed material on a substrate to form a mixed film layer;
performing an ultraviolet light irradiation treatment to the mixed film layer; and
performing a heat treatment to the mixed film layer, wherein at least a part of the particle structures is thermally decomposed into a gas, so the decomposed particle structures are converted into a plurality of pore structures,
wherein the mixed film layer comprises a first region and a second region, the first region and the second region are connected each other;
the step of performing the ultraviolet light irradiation treatment to the mixed film layer comprises following steps of:
shielding the first region with a mask; and
illuminating the ultraviolet light to the second region.

2. The film structure preparing method according to claim 1, wherein the step of preparing the particle structures comprises steps of:
preparing a plurality of mixtures;
forming a protective layer on an outer surface of the mixture to cover the mixture, wherein the mixture and the protective layer form the particle structure.

3. The film structure preparing method according to claim 2, wherein the mixture comprises a polypropylene carbonate resin and a photoacid generator.

4. The film structure preparing method according to claim 1, wherein the step of performing the heat treatment to the mixed film layer, wherein the at least a part of the particle structures is thermally decomposed into the gas, so the decomposed particle structures are converted into the pore structures, comprises:
heating the mixed film layer at a setting temperature, and the polypropylene carbonate resin of the particle structures located in the second region is thermally decomposed into the gas, so the particle structures in the second region are converted into the pore structures.

5. The film structure preparing method according to claim 4, wherein the setting temperature is N, and 100° C.≤N<150° C.

* * * * *